United States Patent [19]

Long

[11] 4,023,077
[45] May 10, 1977

[54] GATING CIRCUIT
[75] Inventor: Peter Graham Long, Colchester, England
[73] Assignee: The Colchester Lathe Company Limited, Colchester, England
[22] Filed: Sept. 12, 1975
[21] Appl. No.: 612,910
[30] Foreign Application Priority Data
Sept. 17, 1974 United Kingdom ............ 40435/74
[52] U.S. Cl. ................................ 361/187; 361/170
[51] Int. Cl.² ...................................... H01H 47/32
[58] Field of Search ...... 317/5, 6, 148.5 R, DIG. 1, 317/DIG. 2, 123, 157; 318/284
[56] References Cited
UNITED STATES PATENTS
3,564,366  2/1971  Worrell .......................... 318/284 X
3,800,139  3/1974  Clark ................................. 317/5 X
3,899,716  8/1975  Kaminski .............................. 317/5

Primary Examiner—Harry Moose
Attorney, Agent, or Firm—McCormick, Paulding & Huber

[57] ABSTRACT

A current sensor provides a positive voltage when a non-desired condition is present, such as rotation of machinery above a predetermined speed, and a gating circuit causes contacts of a relay to close whenever the rotational speed drops below such predetermined speed, that is when the desired condition is achieved. The gating circuit also closes these relay contacts in response to failure of the electrical power to such gating circuit. The circuit includes a P-N-P transistor in series with the relay coil, which transistor is switched on or off by a NAND gate. A low level signal to the base of the P-N-P transistor is provided through the NAND gate when the inputs to the gate are high, thereby providing a fail-safe feature for the relay because one of the NAND gate inputs is provided from the sensor's reference voltage through a Schmitt-trigger circuit. Another NAND gate input is provided in pulse form through an amplification stage, and through another Schmitt-trigger circuit, to a retriggerable monostable integrated circuit chip. This input is also fail-safe in that any electrical interference on the input side of the MOS chip and Schmitt-trigger circuits will cause a low level output from the NAND gate, switching the relay contacts open, or off.

4 Claims, 1 Drawing Figure

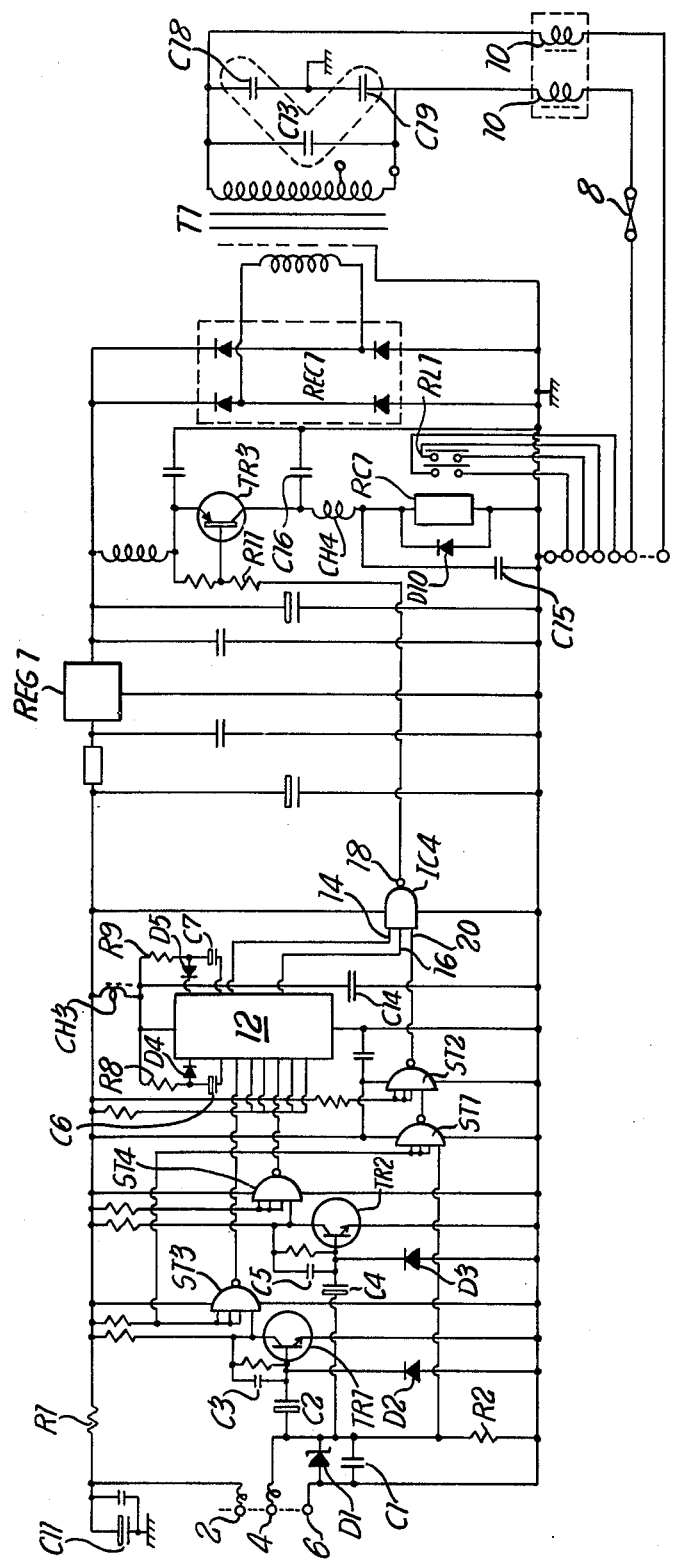

GATING CIRCUIT

The present invention relates to a gating circuit, by which is meant a circuit to produce a required output signal only when at least two input signals are in a chosen condition.

The invention is particularly concerned with, but not exclusively limited to, a gating circuit for controlling the current flow through a relay coil in order to operate a relay in a chosen manner. Such a circuit will clearly have many applications, and one application is to control a hydraulically or pneumatically operable lathe chuck. This type of chuck is opened or closed by an operator depressing a push button to enable a workpiece to be removed from or inserted in the chuck. The purpose of the circuit is to prevent the operator inadvertantly opening or closing the chuck while it is rotating at above a chosen low speed.

Accordingly to the invention there is provided a gating circuit to produce a required output signal only when at least two input signals are in a chosen condition; said circuit including first means responsive to a failure in the power supply to the circuit to take one of said input signals outside said chosen condition and second means responsive to received electrical interference to take the other of said signals outside said chosen condition. The said first means may also be responsive to a break in the circuit of said other input signal to take said one input signal outside said chosen condition.

The said second means may comprise at least two circuits to pass said other input signal; the two circuits being arranged in parallel so that at least one circuit will pass the input signal if the other circuit should fail.

The gating circuit can be used to control the current flow through the coil of a relay in order to operate the relay in a chosen manner. The gating circuit and relay coil may be arranged so that a failure in the power supply renders the relay inoperative.

The current passing through the relay coil can be smoothed by a choke-capacitor filter. The relay and coil can be arranged so that the relay coil is de-energised if the, or any, capacitor in the filter becomes short-circuited.

The said first means may comprise a resistor connected between the power supply of the circuit and earth, and at least one Schmitt-trigger circuit to receive the voltage developed across the resistor.

The said second means may comprise at least two parallel amplifier and Schmitt-trigger circuits. The output signal from each of these circuits may be fed into a respective one of parallel re-triggerable monostable integrated circuits.

The output signals from the first and second means may be fed to the input terminals of a nand gate by which is meant a circuit arranged to receive a plurality of input signals and to produce a required output signal only when all the input signals are in a chosen condition.

One gating circuit of the invention will now be described by way of example with reference to the accompanying drawing. This drawing is a circuit diagram of the gating circuit for use with a hydraulically or pneumatically operable lathe chuck. The purpose of the gating circuit is to prevent the chuck from being opened or closed while the chuck is rotating at more than five revolutions per minute, and/or if a fault has developed in a part of the control system or in the power supply thereto.

Referring to the drawing, the gating circuit includes a sensor (not shown) which monitors the rotatable speed of the lathe chuck. This sensor comprises a coil located in the magnetic path between a permanent magnet and the circumferential teeth of a gear wheel which rotates with the lathe chuck. Rotation of the chuck and hence of the gear wheel produces in the sensor an alternating current signal having an amplitude and frequency proportional to the rotational speed of the lathe chuck. If there is no fault in the circuit or power supply, and if the chuck is rotating at less than five revolutions per minute, the output signal from the sensor causes a relay coil RC1 to be energised thereby closing a relay RL1. This relay closure completes the circuit to the chuck from a lathe control thereby enabling the chuck to be opened or closed by an operator. The lathe is designed so that the chuck can be opened or closed only when the relay RL1 is closed.

The sensor includes a coil connected between circuit terminals 2 & 4, and a screen connected to a terminal 6 which is earthed. The circuit is energised from a 110 volt, 50Hz single phase supply which is passed through a fuse 8 and a filter network to the input coil of a mains transformer T 1. The filter network comprises a choke 10 in each supply line, a capacitor C13 between the supply lines, and capacitors C18 and C19 between each supply line and earth. The transformer T1 provides an output voltage of approximately 8.5 volts AC which is rectified by a full-wave bridge REC1. The fluctuating DC output voltage from the rectifier REC1 has a maximum value of 12 volts. This voltage is passed to a regulator REG1 providing a smoothed DC output voltage of 5 volts. The 12 volt supply provides current for the relay coil RC1 and a P-N-P transistor TR3 which are connected in series between the 12 volts supply line and earth. The current flowing through the coil RC1 and the transistor TR3 is smoothed by a filter consisting of a choke CH4 and capacitors C15 & C16. A diode D10 is connected across the relay coil RC1 to protect the transistor TR3 against large reverse voltages. The transistor TR3 is switched on or off by a nand gate IC4 having an output terminal 18 connected to the base of the transistor through a resistor R11. The circuit is arranged so that the transistor is is switched on when a low level signal appears on the terminal 18. This occurs only when a high level signal is present on all the nand gate terminals 14, 16 and 20. If a low level signal appears on one or more of the input terminals, then a high level signal appears on the output terminal 18 thereby switching off the transistor TR3. Switching on the transistor TR3 energises the relay coil RC1 to close the relay RL1. Switching off the transistor TR3 de-energises the relay coil RC1 to open relay RL1.

The capacitor C11 earths the circuit terminal 2 as regards the AC output signal from the sensor. The five volt DC supply is passed from the regulator REG1 through a resistor R1, the sensor coil and a resistor R2 to earth. The steady voltage developed across the resistor R2 is passed to the input of a Schmitt-trigger circuit ST1. When the power supply and sensor are operating correctly, the steady voltage developed across the resistor R2 is greater than a chosen triggering level. This high level input signal causes ST1 to produce a low level output signal which is passed to the input of a Schmitt-trigger circuit ST2. This causes ST2 to produce a high level output signal which is passed to the input terminal 20 of the nand gate IC4. If the voltage across R2 falls below the triggering level due for example to a failure of the power supply, or a break in or earthing of the sensor wires, then the output signal switches to a high level causing the output signal from ST2 to switch to a low level. This low level signal is passed to the input terminal 20 and prevents the nand gate IC4 from switching on the transistor TR3. Therefore, if there is a power failure or a break in or earthing of the sensor wires, the relay RL1 is held open so that the chuck cannot be opened or closed.

A zener-diode D1 is connected between the circuit terminals 4 & 6 to limit positive voltage variations to within 5.5 volts and negative voltage variations to within 1 volt. A small capacitor C1 is connected between the terminals 4 & 6 to bypass any high frequency current induced in the sensor. Two identical amplifier circuits having respective transistors TR1 and TR2 are connected in parallel to the terminal 4 by respective capacitors C2 and C4. These amplifier circuits include capacitors C3 and C5 to reduce amplification at high frequencies, and diodes D2 and D3 to prevent negative voltages greater than one volt from being applied to the bases of the transistors TR1 and TR2. The output signals from the amplifier circuits are fed into respective parallel Schmitt-trigger circuits ST3 and ST4 which are housed in separate integrated circuit packs so that one circuit will remain operative if the other circuit should fail.

Each Schmitt-trigger circuit ST3 and ST4 produces constant amplitude output pulses when it receives input pulses of an amplitude above a triggering level. The frequency of the output pulses is equal to the frequency of the input pulses. When the input pulse amplitude falls below the triggering level then each Schmitt-trigger circuit produces an output signal of constant steady amplitude which may be either a high or low level. The output signals from the circuits ST3 and ST4 are fed into two parallel re-triggerable monostable integrated circuits 12 which are housed in one pack. The output signals from these circuits 12 are connected to inputs of the nand gate IC4.

Each monostable circuit 12 is arranged so that it produces a steady high level output signal when its input signal is of constant or steady amplitude. If its input signal is a pulse train then the monostable circuit produces a low level output signal; the form of the output signal being controlled by the delay circuits R8, D4, C6 and R9, D5, C7, The previously mentioned filter consisting of the choke CH4 and capacitors C15 and C16 prevents unwanted alternating current interference which may have been picked up by the relay coil RC1 from being transmitted back into the electronic circuitry via the transistor TR3. In addition, the circuits 12 are protected from unwanted alternating current interference from the five volts supply line by a filter consisting of a choke coil CH3 and a capacitor C14.

If the lathe chuck rotates at more than five revolutions per minute, the amplitude of the sensor alternating current output signal when amplified by transistors TR1 & TR2 is above the triggering level of the circuits ST3 and ST4. Therefore the circuits ST3 and ST4 each emit a train of output pulses which causes monostable circuits 12 to emit a low level output signal. These low level signals are passed to the input terminals 14 and 16 of the nand gate IC4 thereby switching off the transistor TR3. This de-energises the relay coil RC1 thereby opening the relay RL1 so that the lathe chuck cannot be opened or closed.

The control system is designed so that any electrical inteference present in the electronic circuitry on the input side of the circuits ST3 and ST4 will cause ST3 and ST4 to produce output pulses thereby causing the monostable circuits 12 to emit a low level output signal. Consequently, the electrical interference will fail-safe i.e. switch off the transistor TR3 thereby opening the relay RL1.

If the lathe chuck rotates at less than five revolutions per minute, and if the control system and power supply are working correctly, then the input pulses to the circuits ST3 and ST4 fall below the triggering level. This causes the circuits ST3 and ST4 to produce an output signal of constant or steady amplitude thereby causing the monostable circuits 12 to pass high level output signals to the nand gate input terminals 14 & 16. As the control system and power supply are working correctly, there is a high level signal on the input terminal 20. These three high level input signals cause the nand gate IC4 to produce a low level output signal thereby switching on the transistor TR3 and closing the relay RL1. The chuck can now be opened or closed by an operator.

Each circuit 12 may, for example, be an electro-magnetic device having a pneumatic delay, or an integrated electronic circuit provided with a combination of a resistor and a capacitor used as a delay element.

It will be appreciated that the illustrated control system includes two transistor amplifier circuits and integrated circuits 12 in parallel with one another. The advantage of this arrangement is that the control system still operates satisfactorily if a fault develops in either one of the two parallel circuits.

One safety feature of the illustrated control system is that the realy coil RC1 will not be energised should either of the capacitors C15 or C16 become short-circuited.

What I claim is:
1. A control circuit for a relay or the like, said circuit comprising:
   a. sensor circuit means for monitoring a parameter and for producing sensor output signals related to that parameter, said sensor output signals being in a chosen condition only when the value of said parameter is within a preselected range,
   b. first circuit means including a resistor connected between the power supply for said sensor means and ground (earth), and at least one Schmitt-trigger coupled thereto for sensing said supply voltage and providing a first signal which is in a chosen condition only when said supply voltage exceeds a predetermined level,
   c. second means responsive to electrical interference in said sensor circuit and in said first circuit means to take said sensor output signals outside the chosen condition,
   d. NAND gate means for receiving said sensor output signals and said first signal to provide a NAND gate output of a preselected level only when all said signals are present in their chosen condition, and
   e. signal conditioning means for said NAND gate output to energize the relay only when said NAND gate output has said preselected level.

2. The control circuit of claim 1 wherein said second means comprises at least one series connected amplifier Schmitt-trigger circuit.

3. The control circuit of claim 1 wherein said second means comprises at least two series connected amplifier Schmitt-trigger coupled circuits arranged in parallel so that at least one of them provides a sensor output signal for said NAND gate means.

4. The control circuit of claim 3 wherein said signal conditioning means comprises transistor switching means arranged to conduct only when said NAND gate output has said preselected level.

* * * * *

UNITED STATES PATENT OFFICE
CERTIFICATE OF CORRECTION

Patent No. 4,023,077      Dated May 10, 1977

Inventor(s) Peter Graham Long

It is certified that error appears in the above-identified patent and that said Letters Patent are hereby corrected as shown below:

Column 1, line 1, delete "circuit,by" and substitute --circuit, by--.

Column 1, line 20, delete "accordingly" and substitute --according--.

Column 1, line 56, Column 2, lines 43 and 48, Column 3, lines 1, 7, 42 and 67, Column 4, line 22, delete "nand" and substitute --NAND--.

Column 4, line 37, delete "realy" and substitute --relay--.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*